(12) United States Patent
Hayakawa (10) Patent No.: US 11,454,780 B2
(45) Date of Patent: Sep. 27, 2022

(54) LENS APPARATUS TO WHICH INTERMEDIATE ADAPTER IS MOUNTABLE, OPTICAL APPARATUS, AND IMAGING SYSTEM

(71) Applicant: CANON KABUSHIKI KAISHA, Tokyo (JP)

(72) Inventor: Makoto Hayakawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 270 days.

(21) Appl. No.: 16/804,530

(22) Filed: Feb. 28, 2020

(65) Prior Publication Data

US 2020/0285022 A1 Sep. 10, 2020

(30) Foreign Application Priority Data

Mar. 7, 2019 (JP) .............................. JP2019-041099

(51) Int. Cl.
| | |
|---|---|
| *G02B 7/10* | (2021.01) |
| *G02B 15/14* | (2006.01) |
| *G02B 7/14* | (2021.01) |
| *G03B 17/56* | (2021.01) |

(52) U.S. Cl.
CPC ................ *G02B 7/10* (2013.01); *G02B 7/14* (2013.01); *G02B 15/142* (2019.08); *G03B 17/565* (2013.01)

(58) Field of Classification Search
CPC .......... G02B 7/10; G02B 7/14; G02B 15/142; G02B 27/646; G02B 7/04; G03B 17/565; G03B 17/566; G03B 17/14; H04N 5/2254
See application file for complete search history.

(56) References Cited

U.S. PATENT DOCUMENTS

| | | | |
|---|---|---|---|
| 5,734,935 A | 3/1998 | Imanari | |
| 2011/0286110 A1* | 11/2011 | Ota | G03B 17/04 359/694 |

FOREIGN PATENT DOCUMENTS

| | | |
|---|---|---|
| CN | 101118310 A | 2/2008 |
| CN | 101158742 A | 4/2008 |
| CN | 101178468 A | 5/2008 |
| CN | 101211001 A | 7/2008 |

(Continued)

OTHER PUBLICATIONS

Extended European Search Report issued in European Appln. No. 20161107.6 dated Aug. 4, 2020.

(Continued)

*Primary Examiner* — James C. Jones
(74) *Attorney, Agent, or Firm* — Rossi, Kimms & McDowell LLP (57) ABSTRACT

A lens apparatus of which an image side part is detachably mountable to an accessory includes a lens unit that includes a lens disposed closest to the image side part and a holding member that holds the lens, and is movable in an optical axis direction, and a restrictor configured to restrict a movement of the lens unit. When the lens unit is located at a first position, the accessory is not mountable to the lens apparatus, and when the lens unit is located at a second position, the accessory is mountable to the lens apparatus. The restrictor restricts the lens unit from moving without bringing the lens unit into contact with the accessory when the accessory is attached to the lens apparatus.

14 Claims, 9 Drawing Sheets

(56) References Cited

FOREIGN PATENT DOCUMENTS

| | | | |
|---|---|---|---|
| CN | 101295065 | A | 10/2008 |
| JP | H11326737 | A | 11/1999 |
| JP | 3210586 | B2 | 9/2001 |
| JP | 2007025350 | A | 2/2007 |

OTHER PUBLICATIONS

Office Action issued in Chinese Appln. No. 202010137727.X dated Mar. 25, 2022. English translation provided.

\* cited by examiner

LENS APPARATUS TO WHICH INTERMEDIATE ADAPTER IS MOUNTABLE, OPTICAL APPARATUS, AND IMAGING SYSTEM

BACKGROUND OF THE INVENTION

Field of the Invention

The present invention relates to a lens apparatus serving as an interchangeable lens, to which an intermediate adapter, such as an extender, is detachably mountable, and an imaging system.

Description of the Related Art

Some interchangeable lenses are used for an imaging apparatus (camera) while an intermediate adapter such as an extender is attached between them. Japanese Patent No. 3210586 discloses a camera system in which an intermediate adapter can be attached only to an interchangeable lens having a backfocus equal to or longer than a predetermined value.

However, some interchangeable lenses move the lens unit closest to the image during zooming or focusing between a position where the intermediate adapter is mountable and a position where the intermediate adapter is not mountable. If the user forcibly attempts to attach the intermediate adapter to the interchangeable lens when the lens unit is located at the position where the intermediate adapter is not mountable, the intermediate adapter interferes with the lens unit.

SUMMARY OF THE INVENTION

The present invention provides a lens apparatus, an optical system, and an imaging system, each of which can avoid interference between a movable lens unit and an intermediate adapter.

A lens apparatus according to one aspect of the present invention of which an image side part is detachably mountable to an accessory includes a lens unit that includes a lens disposed closest to the image side part and a holding member that holds the lens, and is movable in an optical axis direction, and a restrictor configured to restrict a movement of the lens unit. When the lens unit is located at a first position, the accessory is not mountable to the lens apparatus, and when the lens unit is located at a second position, the accessory is mountable to the lens apparatus. The restrictor restricts the lens unit from moving without bringing the lens unit into contact with the accessory when the accessory is attached to the lens apparatus.

An optical apparatus and imaging system according to another aspect of the present invention include the above lens apparatus.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
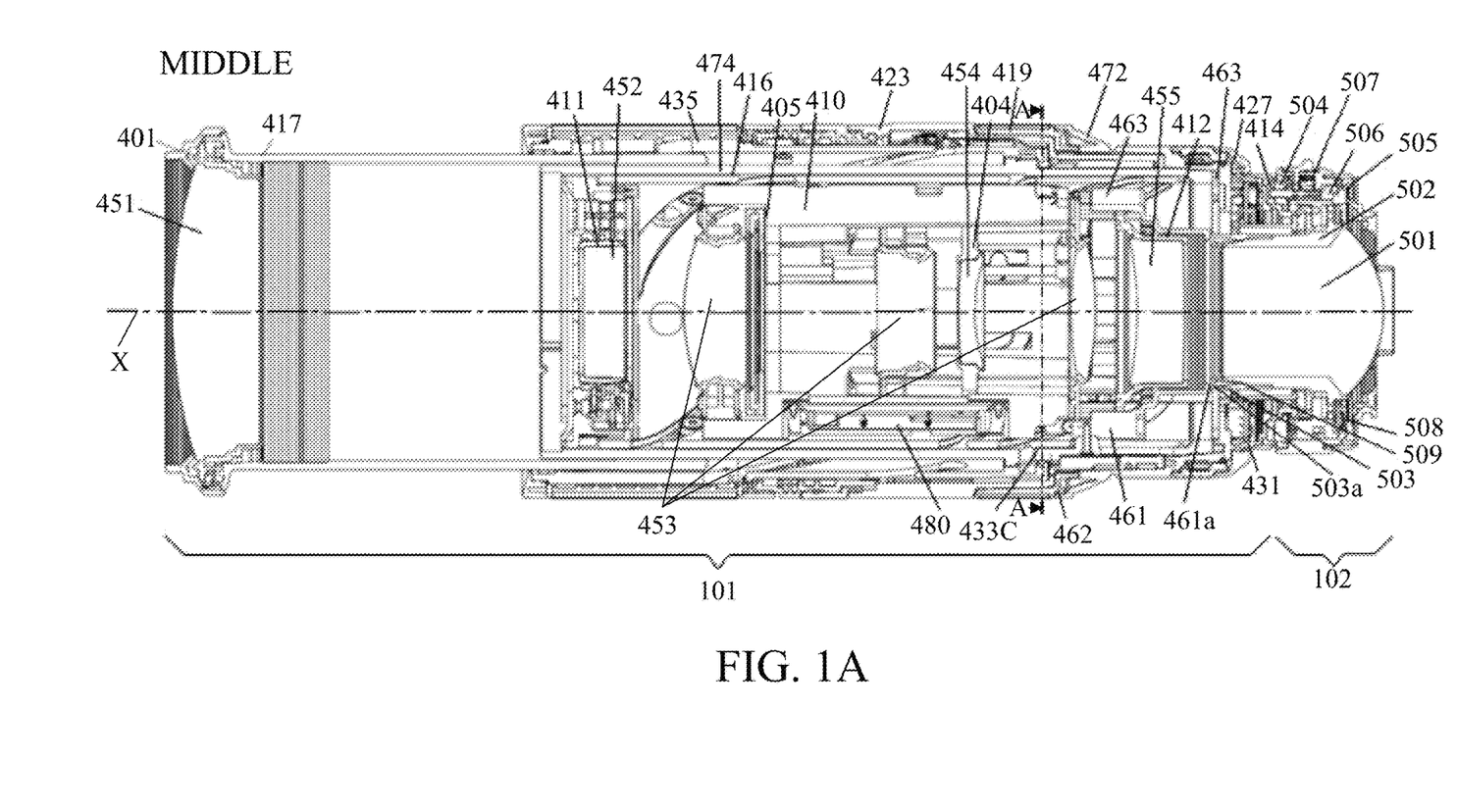
FIG. 1A is a sectional view of an interchangeable lens (Middle) and an extender according to a first embodiment of the present invention.
Figure 1B:
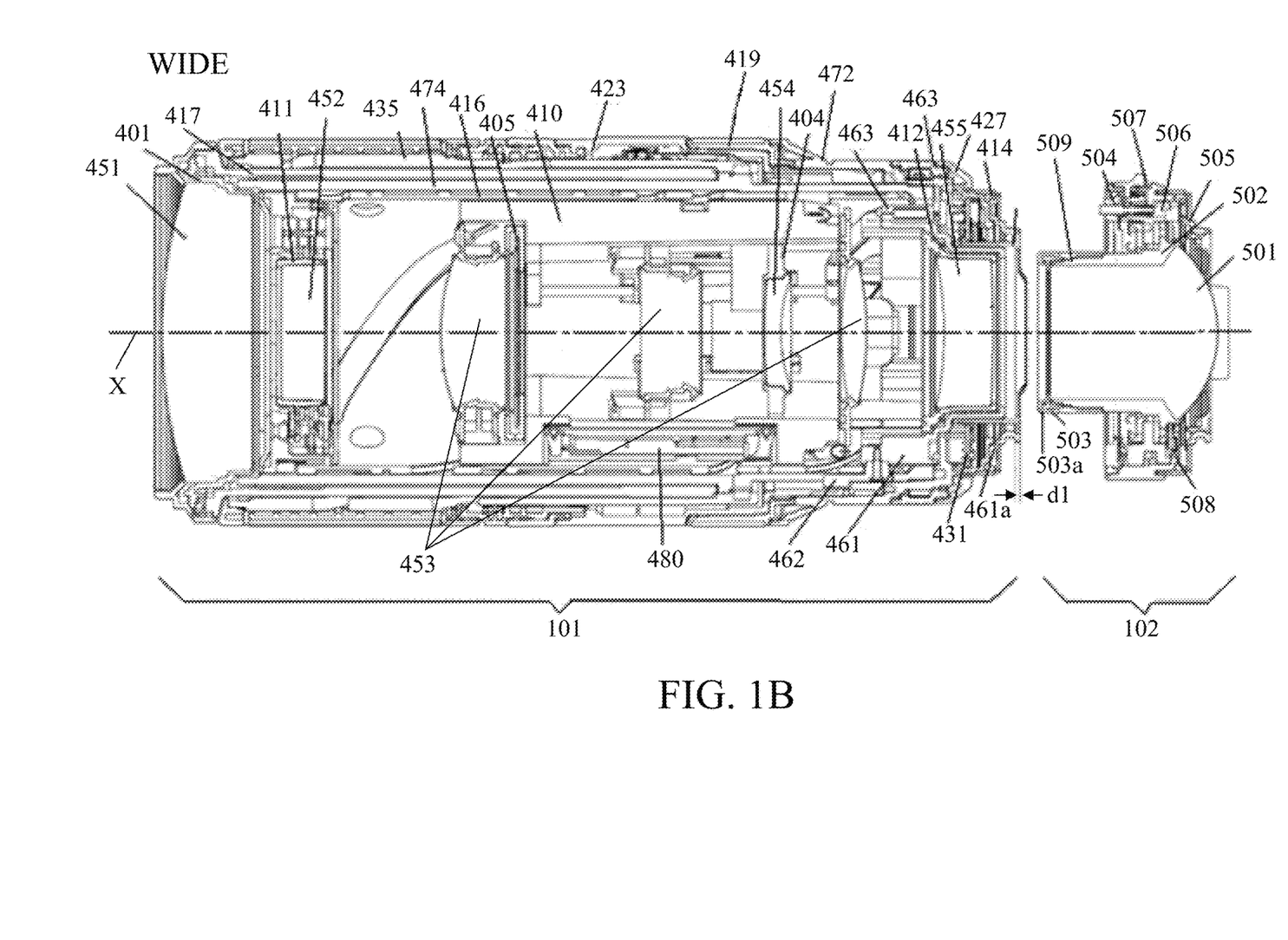
FIG. 1B is a sectional view of an interchangeable lens (Wide) and the extender according to the first embodiment of the present invention.
Figure 2:
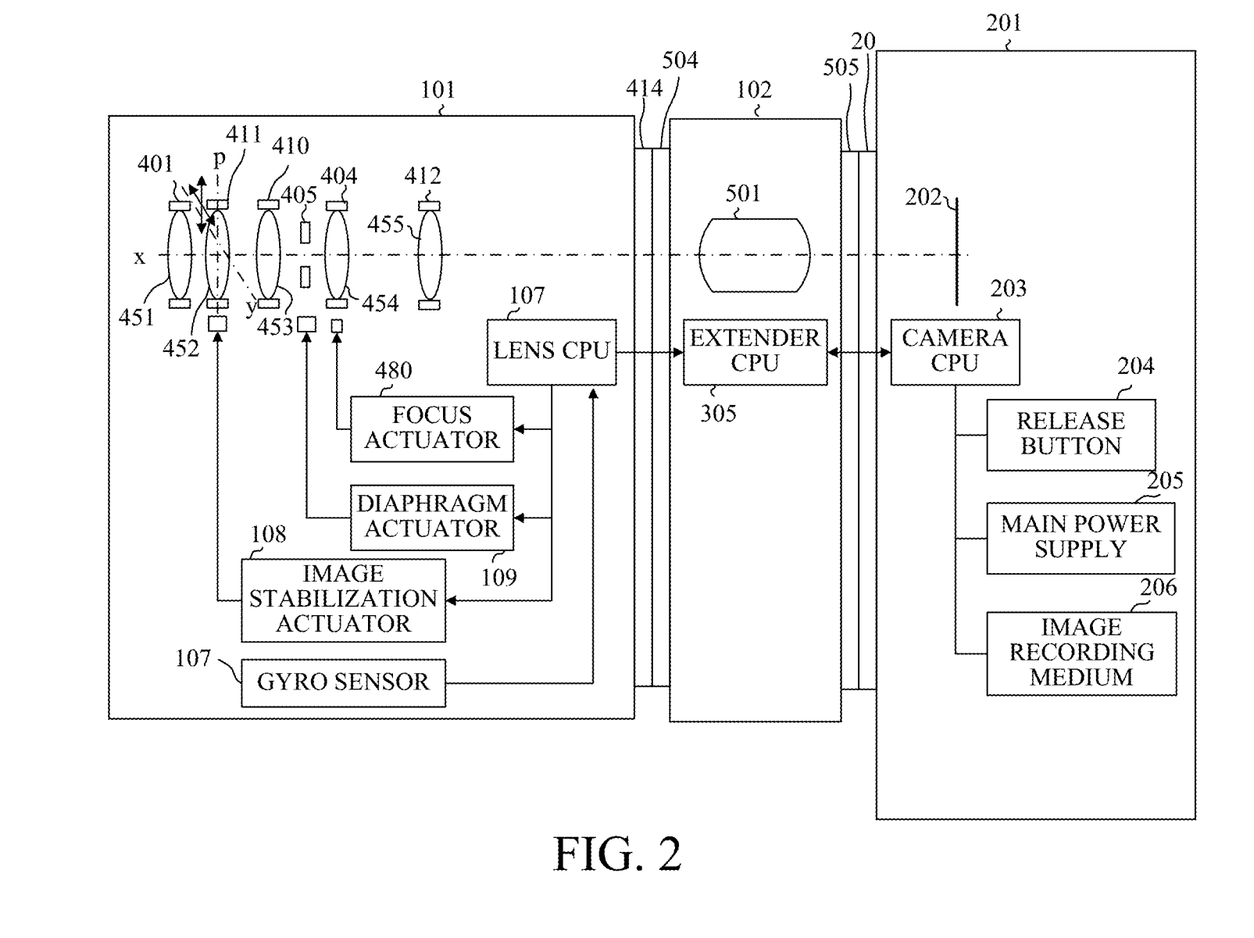
FIG. 2 is a block diagram illustrating a configuration of an imaging system including the interchangeable lens according to the first embodiment.

FIGS. 1A and 1B illustrate a mechanical structure of an interchangeable lens 101 serving as a lens apparatus and an extender 102 serving as an intermediate adapter (accessory) according to a first embodiment of the present invention. FIG. 1A illustrates the interchangeable lens 101 whose zoom state is a predetermined intermediate zoom state Middle, and FIG. 1B illustrates the interchangeable lens 101 whose zoom state is Wide (wide-angle end). FIG. 2 illustrates an electrical configuration of an imaging system including the interchangeable lens 101, a camera 201 serving as an imaging apparatus (image pickup apparatus), and the extender 102. In these figures, x indicates the optical axis of the interchangeable lens 101, and the direction in which the optical axis x extends will be referred to as an optical axis direction.

The interchangeable lens 101 includes a first barrel 401, a diaphragm (aperture stop) unit 405, a focus barrel 404, a rear barrel 410, an image stabilization unit 411, and a fifth barrel 412. Each of the barrels and image stabilization unit 411 holds a lens group including one or more lenses. More specifically, the first barrel 401 holds a first lens (or lenses) 451 disposed closest to the object side among the plurality of lens groups in the interchangeable lens 101, and the focus barrel 404 holds a focus lens group 454. The rear barrel 410 holds three rear lens group 453, the image stabilization unit 411 holds the correction lens group 452, and the fifth barrel (holding member) 412 is a fifth lens group 455 disposed closest to the image among the plurality of lens groups. The fifth barrel 412 and the fifth lens portion held by it constitute the fifth lens unit (412, 455).

A front fixed barrel 423 and a rear fixed barrel 472, which are base members of the interchangeable lens 101, are fixed together with screws and integrated. A front barrel 417 is fixed onto the first barrel 401 and can (retractably) move in the optical axis direction relative to the front fixed barrel 423. The focus barrel 404 is held by the rear barrel 410 via a guide mechanism provided in the focus barrel 404. The focus barrel 404 moves in the optical axis direction relative to the rear barrel 410 for focusing. The rear barrel 410 holds the diaphragm unit 405. The diaphragm unit 405 adjusts a light amount by changing the aperture in the diaphragm. A cam ring 416 serving as a control member has a plurality of cam groove portions, and is engaged with the inner circumference of the guide barrel 474 rotatably in a circumferential direction around the optical axis x (referred to as a direction around the optical axis hereinafter).

A zoom ring 435 is a movable member, a rotation member, and an operation member that are rotatably held around the optical axis by the guide barrel 474. The zoom ring 435 has a plurality of cam groove portions. A cam follower of the front barrel 417 is engaged with the cam groove portion in the zoom ring 435 and a first linear groove portion in the guide barrel 474. The linear groove portion is a groove portion that extends linearly in the optical axis direction. Therefore, when the user rotates the zoom ring 435 in the direction around the optical axis, the front barrel 417 moves in the optical axis direction.

The cam follower provided on the front barrel 417 is engaged with the cam groove portion of the cam ring 416. Therefore, when the front barrel 417 moves in the optical axis direction, the cam ring 416 rotates in the direction around the optical axis. The cam followers provided on the rear barrel 410 and the fifth barrel 412 respectively engage with the cam groove portions separately provided in the cam ring 416 and the rear and fifth linear groove portions of the guide barrel 474. Thus, when the cam ring 416 rotates, the rear barrel 410 and the fifth barrel 412 move in the optical axis direction. Thus, the first barrel 401 (first lens group 451), the rear barrel 410 (rear lens group 453), and the fifth barrel 412 (fifth lens portion) move in the optical axis direction of the interchangeable lens 101. Thus, a magnification variation (zooming) is performed.

The image stabilization unit 411 is fixed to a guide barrel 474 integrally fixed with screws to the rear fixed barrel 472 serving as the base member of the interchangeable lens 101, and does not move in the optical axis direction during zooming.

A driving IC 431 is a printed circuit board on which a microcomputer and the like are disposed, and is fixed to the rear fixed barrel 472. An external appearance ring 427 is fixed onto the rear fixed barrel 472 together with a mount portion 414 by screws. A manual focus (MF) ring unit 419 is supported by the front fixed barrel 423 so as to be rotatable around the optical axis. A focus actuator 480 is fixed onto the rear barrel 410 and drives the focus barrel 404 in the optical axis direction.

As illustrated in FIG. 2, the interchangeable lens 101 has a lens CPU 107 that controls and processes the entire interchangeable lens 101. The lens CPU 107 controls a diaphragm actuator 109 and a focus actuator 480 to change an aperture diameter of the diaphragm unit 405 to adjust the light amount, or to drive the focus barrel 404 for focusing.

When the user rotates the MF ring unit 419, the rotation is detected by the lens CPU 107 through an illustrated sensor. The lens CPU 107 controls a focus actuator 480 according to a rotation amount of the MF ring unit 419, and moves the focus barrel 404 in the optical axis direction. Thereby, MF is performed. The lens CPU 107 controls the focus actuator 480 according to a focus control command received from the camera CPU 203 described later, and moves the focus barrel 404 in the optical axis direction. Thereby, autofocus (AF) is performed.

The interchangeable lens 101 has a gyro sensor 106 for detecting the shake of the interchangeable lens 101. The lens CPU 107 calculates a shake correction amount according to the shake detected by the gyro sensor 106, and controls an image stabilization actuator 108. Thereby, the correction lens group 452 in the image stabilization unit 411 is driven in the y direction (yaw direction) and the p direction (pitch direction) orthogonal to the optical axis x of the interchangeable lens 101 for the image stabilization.

In FIGS. 1A and 2, a lens-side mount portion 504 of the extender 102 is detachably attached (bayonet-coupled) to the mount portion 414 of the interchangeable lens 101. A camera-side mount section 505 of the extender 102 is detachably attached (bayonet-coupled) to a mount portion 207 of the camera 201.

The extender 102 includes an extender lens unit 501 and an extender CPU 510. The extender lens unit 501 extends the focal length of the imaging optical system (increases the magnification) by adding itself to a plurality of lens units constituting the imaging optical system in the interchangeable lens 101. The extender CPU 510 can communicate with the lens CPU 107 and the camera CPU 203. The detailed configuration of the extender 102 will be described later.

The camera 201 has an image sensor 202, a camera CPU 203, a release button 204, and a main power supply (battery) 205. The image sensor 202 includes a photoelectric conversion element such as a CMOS sensor, and captures (photoelectric conversion) an object image formed by the imaging optical system. The camera CPU 203 starts an imaging preparation operation. such as an image stabilization operation, AF and automatic exposure (AE), in response to a half-press operation of the release button 204 by the user. The camera CPU 203 causes an imaging operation to be performed in response to a full-press operation of the release button 204 by the user, and records the generated captured image data on the recording medium 206. The main power supply 205 supplies the power to the camera 201, and supplies the power to the extender 102 and the interchangeable lens 101 via the mount portion 207.

The camera CPU 203 communicates with the extender CPU 510 and the lens CPU 107 via an unillustrated contact block provided to the mount unit 207. A contact block (not shown) for communication use is also provided to the lens-side and camera-side mount portions 504 and 505 of the extender 102 and the mount portion 414 of the interchangeable lens 101.

A detailed configuration of the extender 102 will be described. The extender lens unit 501 is held by the barrel 502 by screwing the press ring 509 into the barrel 502. The barrel 502 is screwed into a base frame 506 as the base member of the extender 102. The lens-side mount portion 504 is fixed to the base frame 506 with screws. The barrel 502 and the extender lens unit 501 partially protrude further toward the object side than the lens-side mount 504. Therefore, when the extender 102 is attached to the interchangeable lens 101 as illustrated in FIG. 1A, parts of the barrel 502 and the extender lens unit 501 of the extender 102 protrude into the interchangeable lens 101.

A holding ring 509 is attached to the outer circumference of a portion of the barrel 502 protruding from the lens-side mount portion 504 toward the object side, and a protective rubber ring 503 is adhered to a tip of the outer circumference of the holding ring 509 on the object side. A contact portion 503a is provided to the tip of the protective rubber ring 503.

The camera-side mount 505 is fixed to the base frame 506 together with an exterior frame 507. A printed circuit board 508 on which electric components such as the extender CPU 510 are mounted is fixed to the base frame 506 with screws.

Figure 3:
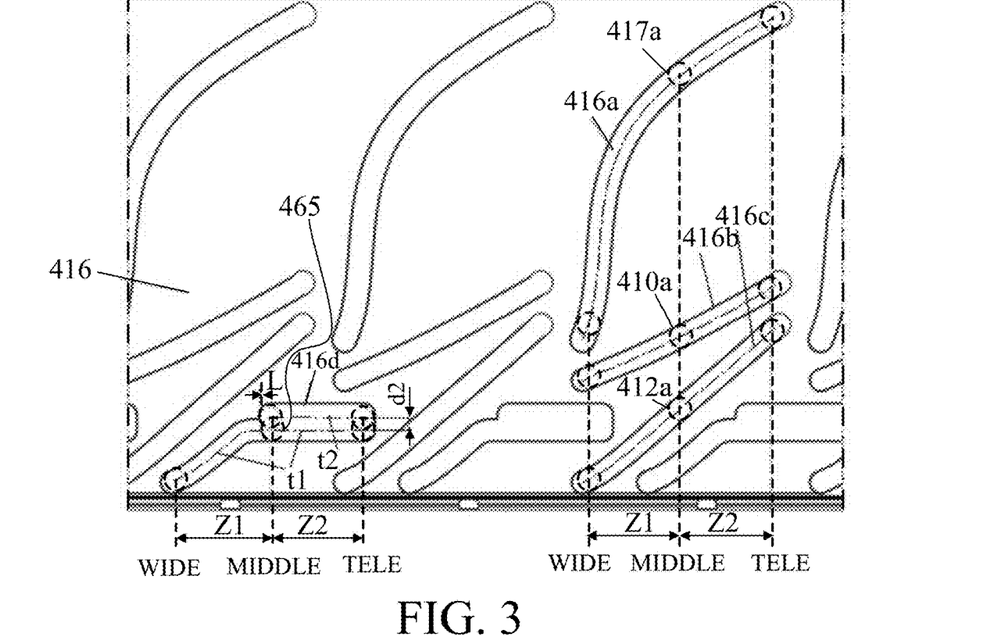
FIG. 3 is a developed view of a cam ring provided to the interchangeable lens according to the first embodiment.

FIG. 3 illustrates the cam ring 416 developed in the direction around the optical axis and viewed from the outer circumferential side. A cam follower 417a of the front barrel 417 is engaged with a cam groove portion 416a, and a cam follower 410a of the rear barrel 410 is engaged with the cam groove portion 416b. A cam follower 412a of the fifth barrel 412 is engaged with a cam groove portion 416c. The cam groove portion 416b corresponds to a first cam portion.

As described above, when the zoom ring 435 rotates around the optical axis, the front follower 417 moves in the optical axis direction because the cam follower 417a of the front barrel 417 is engaged with the cam groove portion of the zoom ring 435. When the front barrel 417 moves in the optical axis direction, the cam ring 416 rotates in the direction around the optical axis due to the engagement between the cam follower 417a and the cam groove portion 416a of the cam ring 416. When the cam ring 416 is rotated, the cam groove portions 416b and 416c are engaged with the cam followers 410a and 412a of the rear barrel 410 and the fifth barrel 412, so that the rear barrel 410 and the fifth barrel 412 move in the optical axis direction. Since the front barrel 417, the rear barrel 410, and the fifth barrel 412 have optical followers 417a, 410a, and 412a engaged with the first, rear, and fifth linear groove portions of the guide barrel 474, they are guided in the optical axis direction while prevented from rotating around the optical axis.

Figure 4:
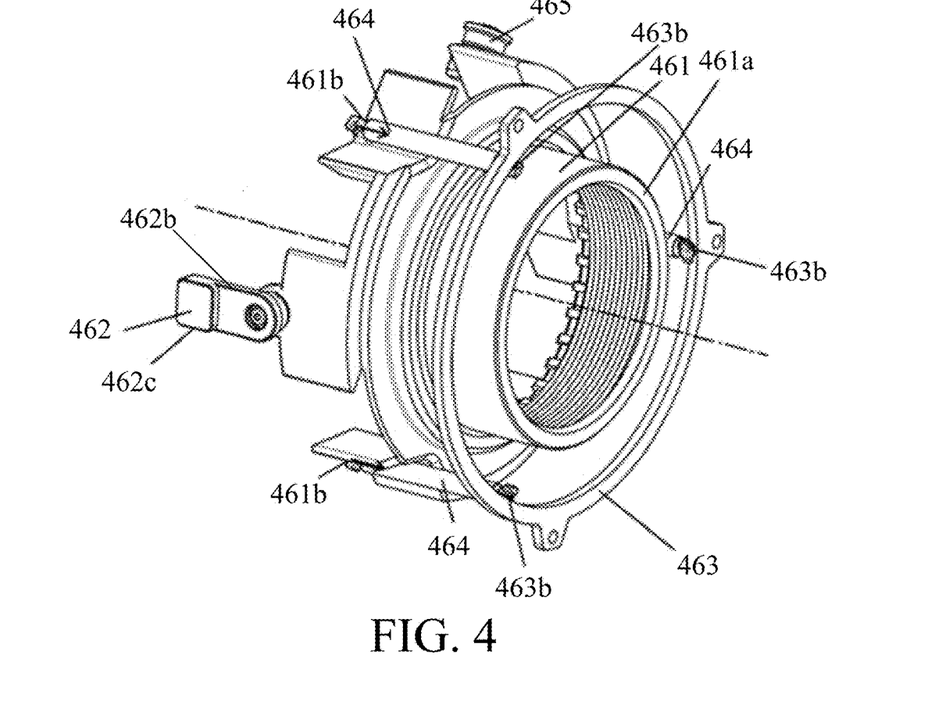
FIG. 4 is a perspective view of a protective frame unit and a spring hook portion provided to the interchangeable lens according to the first embodiment.

FIG. 4 illustrates a protective frame 461 serving as an attachment restricting member. The protective frame 461 is movable in the optical axis direction. The protective frame 461 has two cam followers 465, and the two cam followers 465 and a stopper member 462 serving as a movement restricting member are attached at regular intervals of 120°. The two cam followers 465 and the stopper member 462 are engaged with three cam groove portions 416d provided as second cam portions to the cam ring 416 and three protective frame linear groove portions provided in the guide barrel 474. Thus, as the cam ring 416 rotates, the protective frame 461 moves in the optical axis direction.

The stopper member 462 permits the protective frame 461 to move in the optical axis direction while a locking portion 462c is engaged with the stopper linear groove portion 474d provided in the guide barrel 474, and prevents the protective frame 461 from moving in the direction around the optical axis.

As described above, the zooming is performed when the zoom ring 435 is rotated, and the protective frame 461 moves in the optical axis direction with the zooming. With zooming from the wide-angle side to the telephoto side, the fifth barrel 412 and the protective frame 461 move to the object side.

A more detailed description will be given of the cam groove portion 416d of the cam ring 416. When the zoom state is from Middle to Wide, the cam follower 465 of the protective frame 461 is located within the first cam area on the left side in FIG. 3 of the cam groove portion 416d, and when the zoom state is from Middle to Tele, the cam follower 465 is located within the second cam area on the right side in FIG. 3 of the cam groove portion 416d. This embodiment provides zooming from Wide to Tele by rotating the cam ring 416 counterclockwise viewed from the image side. As illustrated in FIG. 3, the width in the optical axis direction of the second cam area of the cam groove portion 416d is longer to the object side than the width of the first cam area.

In the following description, Z1 is a zoom range from Wide to Middle and Z2 is a zoom range from Middle to Tele. In the interchangeable lens 101, a distance in the optical axis direction from the image-side end surface of the mount portion 414 to the image-side end of the fifth lens unit (412, 455) will be referred to as a fifth lens unit retracted amount. In the extender 102 described above, a distance from the object-side end surface of the lens-side mount unit 504 to the object-side end of the barrel 502 (extender lens group 501) will be referred to as an extender protrusion amount.

At each position (first position or first movable range) of the fifth lens unit (412, 455) in the optical axis direction in the zoom range Z1, the retracted amount of the fifth lens unit is smaller than the extender protrusion amount, or even if the retracted amount of the fifth lens unit is larger than the extender protrusion amount, the extender 102 cannot be attached to the interchangeable lens 101 due to the presence of the protective frame 461 that is not movable to the object side as described later. On the other hand, at each position (second position or second movable range) of the fifth lens unit (412, 455) in the optical axis direction in the zoom range Z2, the retracted amount of the fifth lens unit is larger than the extender protrusion amount and the protective frame 461 can be moved to the object side as described later. Thus, the extender 102 can be attached to the interchangeable lens 101.

When the user attempts to attach the extender 102 to the interchangeable lens 101 in the zoom range Z1, the contact portion 503a of the protective rubber ring 503 provided to the tip of the extender 102 contacts the contact portion 461a, which is the image-side end surface of the protective frame 461. Since the cam follower 456 of the protective frame 461 is engaged with the first cam area of the cam groove portion 416d in the cam ring 416, the protective frame 461 cannot move to the object side and the extender 102 cannot be attached to the interchangeable lens 101.

In this state, when the user forcibly squeezes the extender 102 into the interchangeable lens 101, the squeezing force is applied to the cam follower 465 of the protective frame 461 and the cam groove portion (first cam area) 416d in the cam ring 416 in the cam ring 416 with which the extender is engaged. The stopper member 462 also serves as a third cam follower. Hence, the above squeezing force is received by the cam ring 416 via the stopper member 462 and the cam groove portion (first cam area) 416d in the cam ring 416 with which the stopper member 462 is engaged.

If the user squeezes the extender 102 in a state where the extender 102 contacts the fifth lens unit (412, 455), the excessive force is applied to the cam follower 412a of the fifth barrel 412 and the fifth lens unit (412, 455) themselves and they may be deformed by the application of force. As a result, the imaging optical system is negatively affected, for example, the fifth lens unit (412, 455) is displaced.

On the other hand, in this embodiment, since the cam ring 416 receives the excessive squeezing force of the extender 102 into the interchangeable lens 101, the influence on the imaging optical system as described above can be avoided.

Figure 5A:
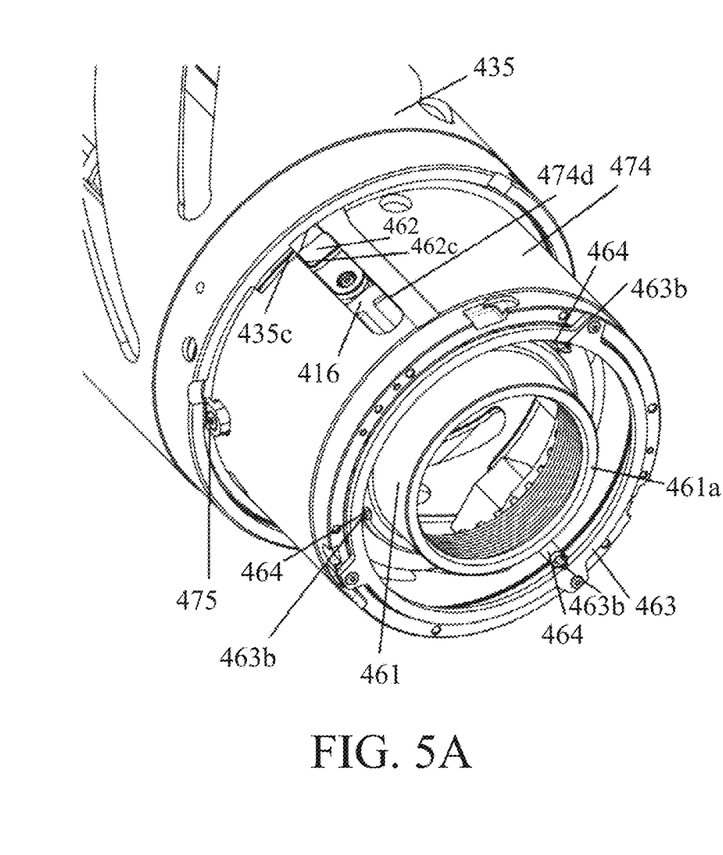
FIGS. 5A and 5B are perspective views showing a protective frame unit and a zoom ring provided to the interchangeable lens according to the first embodiment.
Figure 5B:
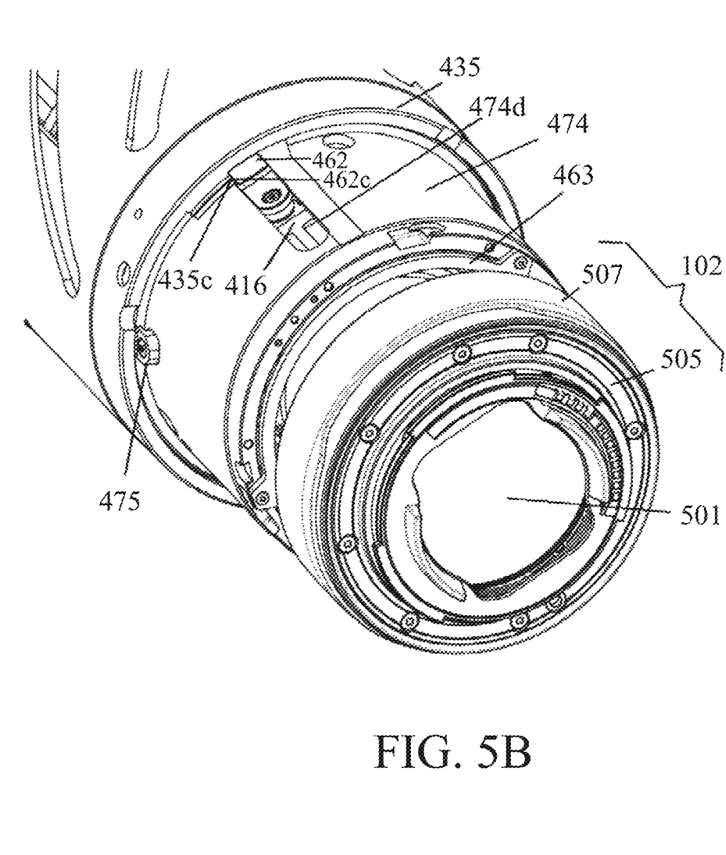

Referring now to FIGS. 4, 5A, and 5B, a description will be given of the structure of the protective frame 461. FIG. 4 illustrates a protective frame unit including the protective frame 461 and the spring hook member 463. FIGS. 5A and 5B illustrate image-side ends of the protective frame unit and the zoom ring 435. For the description purposes, members that hide the end of the zoom ring 435 are omitted. FIG. 5A illustrates a state in which the extender 102 is not attached to the interchangeable lens 101 in Middle, and FIG. 5B illustrates a state in which the extender 102 is attached in Middle.

The spring frame member 463 is fixed to the guide barrel 474 with screws. The spring frame member 463 has three spring hook portions 463b. The protective frame 461 has three spring hook portions 461b. One end of each of the tension springs 464 serving as the three biasing members is hooked on a corresponding one of the three spring hook portions 461b of the protective frame 461, and the other end thereof is hooked on a corresponding one of the three spring hook portions 463b of the spring frame member 463. Thereby, the three tension springs 464 always bias the protective frame 461 toward the image side as illustrated by the arrow in FIG. 4.

Where the extender 102 is not attached to the interchangeable lens 101 in the zoom range Z2 illustrated in FIG. 3, the protective frame 461 is biased toward the image side by the tension spring 461b, and the cam follower 465 is located on the image side of the cam groove portion 416d and contacts the end surface. Therefore, the cam follower 465 moves in the cam groove portion 416d along the locus indicated by t1 in FIG. 3.

On the other hand, when the extender 102 is attached to the interchangeable lens 101 in the zoom range Z2, the contact portion 503a of the protective rubber ring 503 of the extender 102 contacts the contact portion 461a of the protective frame 461. In this state, the lens-side mount portion 504 of the extender 102 has not yet contacted the mount portion 414 of the interchangeable lens 101. Then, when the extender 102 is further squeezed toward the object side relative to the interchangeable lens 101 from this state, the second cam area of the cam groove portion 416d extends toward the object side and thus the cam follower 465 of the protective frame 461 moves (retracts) from the position (extender attachment restricting position) indicated by t1 in FIG. 3 to the position (extender restriction release position) indicated by t2.

As a result, the lens-side mount portion 504 of the extender 102 contacts the mount portion 414 of the interchangeable lens 101, and these can be bayonet-coupled.

Assume that d2 that is a distance from t1 to t2 and serves as a squeezing amount of the extender 102 as illustrated in FIG. 3, and d1 is a thickness of the nail (bayonet nail) for bayonet coupling provided on the mount part 414 as illustrated in FIG. 1B. Then, d1<d2 is set. This is to ensure that the extender 102 cannot be attached to the interchangeable lens 101 in the zoom range Z1. In other words, when d1>d2 and the extender 102 is forcibly squeezed into the interchangeable lens 101 in the zoom range Z1 and the mount portions 414 and 504 are tilted, the bayonet claws may be caught and prevented from being disengaged, or the bayonet claws may get damaged.

Figure 6A:
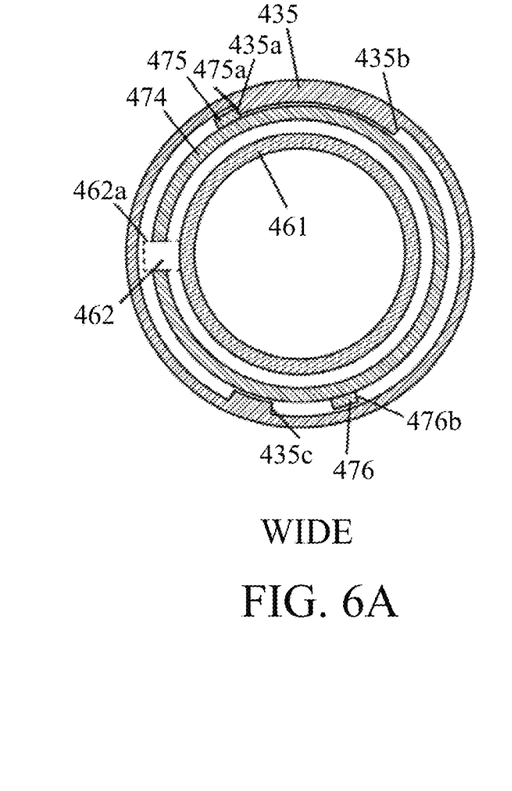
FIGS. 6A to 6C illustrate a rotating end of a zoom ring provided in the interchangeable lens according to the first embodiment.
Figure 6B:
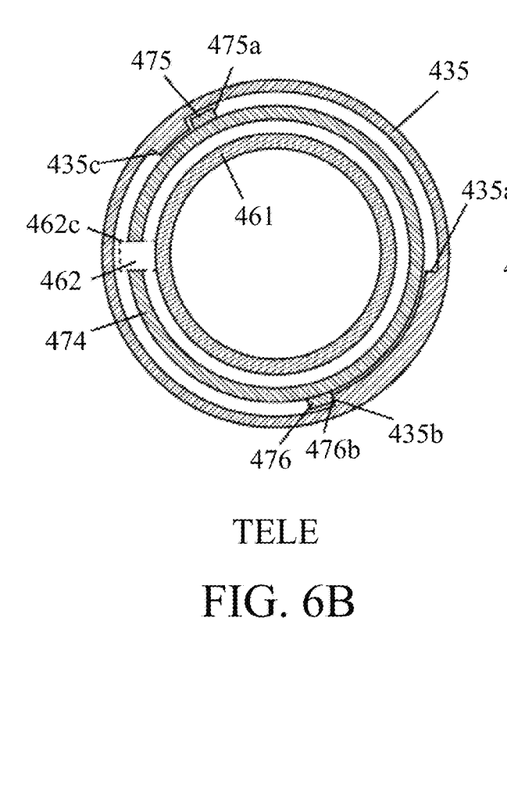
Figure 6C:
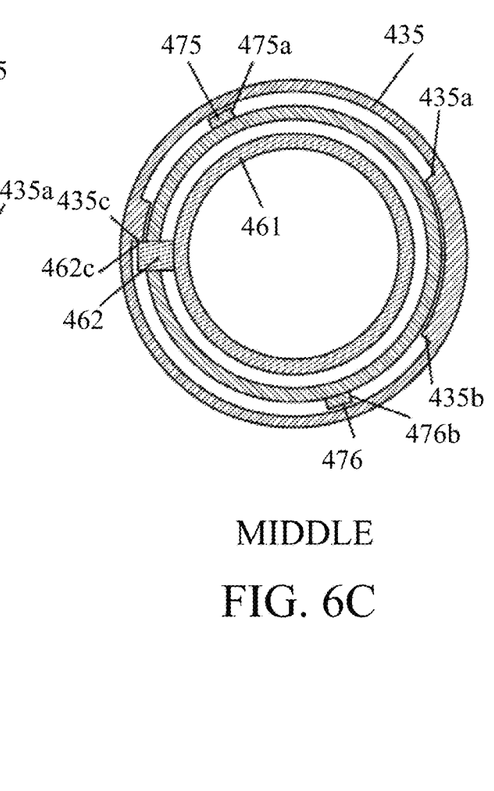

FIGS. 6A to 6C illustrate a section of the interchangeable lens 101 taken along a line A-A and viewed from the object side in FIG. 1A, and schematically show the rotating end of the zoom ring 435. FIG. 6A illustrates the zoom ring 435 at Wide, and FIG. 6B illustrates the zoom ring 435 at Tele. FIG. 6C illustrates the zoom ring 435 at Middle. Referring now to FIGS. 6A to 6C and 5A and 5B, a description will be given of the way of determining Wide, Tele, and Middle mechanical ends, which are the rotating ends of the zoom ring 435.

A mechanical end block 475 is a member for determining a Wide mechanical end. The mechanical end block 475 has a locking portion 475a. When a locking portion 435a provided to the zoom ring 435 contacts the locking portion 475a in the direction around the optical axis, the Wide mechanical end of the zoom ring 435 is determined. A mechanical end block 476 determines the Tele mechanical end. The mechanical end block 476 has a locking portion 476a. When a locking portion 435b provided to the zoom ring 435 contacts the locking portion 476a in the direction around the optical axis, the Tele mechanical end of the zoom ring 435 is determined.

FIGS. 6A and 6C respectively illustrate the zoom ring 435 at Wide and Tele where the extender 102 is not attached to the interchangeable lens 101. In this state, the zoom ring 435 is freely rotatable from Wide to Tele. That is, the fifth lens unit (412, 455) can move in the zoom ranges Z1 and Z2.

FIG. 6C illustrates the zoom ring 435 at Middle where the extender 102 is attached to the interchangeable lens 101. In this state, the locking portion 462c of the stopper member 462 contacts a locking portion 435c of the zoom ring 435 in the direction around the optical axis. Thereby, the zoom ring 435 is restricted from rotating so that it cannot be rotated in the zoom range Z1 from Middle to Wide, in other words, it can be rotated only in the zoom range Z2 between Middle and Tele. As a result, the fifth lens unit (412, 455) from the zoom range Z2 to the zoom range Z1 is restricted from moving.

Referring now to FIGS. 5A and 5B, a description will be given of the movement of the stopper member 462 attached to the protective frame 461 in the optical axis direction. As illustrated in FIG. 5A, when the extender 102 is not attached to the interchangeable lens 101 at Middle, the cam follower 465 of the protective frame 461 is pressed by the biasing force of the tension spring 464 against the image-side end surface in the second cam area of the cam groove portion 416d in the cam ring 416. In this state, the stopper member 462 provided on the protective frame 461 moves away from the zoom ring 435 to the image side. Hence, even if the zoom ring 435 rotates around the optical axis, the locking portion 435c does not contact the locking portion 435c of the stopper member 462. Therefore, the zoom range is not limited to only Z2, and zooming is available in the zoom ranges Z1 and Z2.

On the other hand, when the extender 102 is attached to the interchangeable lens 101 at Middle as illustrated in FIG. 5B, the protective frame 461 is squeezed toward the object side by the extender 102 as described above. As a result, the movement of the cam follower 465 to t2 in the second cam area of the cam groove portion 416d illustrated in FIG. 3 is permitted, whereby the stopper member 462 approaches to the zoom ring 435. As a result, as the zoom ring 435 rotates in the direction around the optical axis, the locking portion 462c of the stopper member 462 contacts the locking portion 435c and the zoom range is limited to the inside of Z2.

An engagement portion 462b of the stopper member 462 contacts the stopper groove 474d of the guide barrel 474 in a plane around the optical axis. Thereby, even when the locking portion 435c of the zoom ring 435 contacts the locking portion 462b of the stopper member 462 and the rotation operation force is applied to the zoom ring 435, the rotation operation force is received by the barrel 474 through the stopper member 462. Accordingly, even when the zoom ring 435 is rotated in the direction around the optical axis toward the WIDE side, the zoom end position can be accurately determined by the stopper member 462. In other words, the zoom end can be prevented from shifting from Middle to Wide.

As illustrated in FIG. 3, a slight gap L is provided on the cam groove portion 416d from Middle to Wide. When the zoom ring 435 is slightly rotated from the position illustrated in FIG. 5A to the Wide side (clockwise viewed from the image side) (in the range of the cam ring rotation angle gap L) and the extender 102 is not mounted, the zoom ring 435 can move from t1 to t2 in the cam groove portion 416d, but the stopper member 462 interferes with (the image-planeside end surface of) the locking portion 435c of the zoom ring 435 in the optical axis direction so that the protective frame 461 cannot be moved to a position corresponding to t2 illustrated in FIG. 3. Therefore, the extender 102 cannot be attached to the interchangeable lens 101. By providing the gap L in the cam groove portion 416d in this manner, a zoomable range can be reliably determined by the zoom ring 435. In other words, the rotating end of the zoom ring 435 is not limited by the cam ring 416.

This configuration was adopted for the following reasons. In the interchangeable lens 101 according to this embodiment, the rotation of the zoom ring 435 causes the front barrel 417 to move in the optical axis direction, and the movement of the front barrel 417 causes the cam ring 416 to rotate. At this time, when the rotation end of the zoom ring 435 is determined by the cam ring 416 (cam groove portion 416d), the cam ring 416 may stop rotating before the front barrel 417. In this case, a drawing amount shift occurs among the front barrel 417, the rear barrel 410, and the fifth barrel 412, and the optical performance lowers.

A description will be given of effects obtained by the interchangeable lens 101 according to this embodiment described above. Conventionally, in designing an interchangeable lens on which an intermediate adapter such as an extender is detachably mountable, a backfocus value of the interchangeable lens is set according to a protrusion amount of the intermediate adapter from the lens-side mount portion to the object side. In an interchangeable lens in which the backfocus value changes when the lens unit moves due to zooming or focusing, it is necessary to secure a minimum backfocus value so that the lens unit and the attached intermediate adapter do not interfere with each other even when the lens unit is located closest to the image and the backfocus value is minimum. However, setting such a minimum backfocus value increases the size of the interchangeable lens and restrains the optical performance.

On the other hand, in an interchangeable lens in which the minimum backfocus value is not set as described above, only if the user moves the movable lens unit in advance to a position where the movable lens unit does not interfere with the intermediate adapter, the intermediate adapter can be attached to the interchangeable lens. However, if the user forcibly squeezes the intermediate adapter into the interchangeable lens when the lens unit is not moved to the object side in such an interchangeable lens, the interchangeable lens including the lens unit and the intermediate adapter may get damaged.

In order to solve such a problem, in the interchangeable lens 101 according to this embodiment, in the zoom region Z1 (Wide to Middle) where the fifth lens unit (412, 455) is located on the image side, the protective frame 461 serving as the attachment restricting member separate from the fifth lens unit (412, 455) restricts the intermediate adapter (102) from being attached. Thereby, it is possible to prevent the interchangeable lens and the intermediate adapter from getting damaged by the user forcibly squeezing the intermediate adapter into the interchangeable lens 101.

In the zoom range Z2 (Middle to Tele) where the fifth lens unit (412, 455) is located on the object side, the interchangeable lens 101 according to this embodiment permits the intermediate adapter to be attached, and restricts a movable range of the fifth lens unit (412, 455) to the zoom range Z2. Thereby, the interchangeable lens 101 can be made smaller and restrictions on the optical performance is less restricted than the case where the minimum backfocus value is set so that the lens unit and the intermediate adapter do not interfere with each other in all zoom ranges. In order to restrict the movable range of the fifth lens unit (412, 455), the stopper member 462 provided to the protective frame 461 moved to the object side by attaching the intermediate adapter mechanically prevents the zoom ring 435 from rotating. Thereby, the fifth lens unit (412, 455) can be prevented from interfering with the intermediate adapter even if the user forcibly or erroneously rotates the zoom ring 435 toward the zoom range Z1.

Thus, the protective frame 461 has two roles of protecting the interchangeable lens 101 and the intermediate adapter and of restricting the zoom range. In comparison with a case where members having these roles are separately provided, the number of components is reduced, and the interchangeable lens 101 is made smaller.

As a method of restricting the zoom range, an operation member for restricting the zoom range may be provided to the outer surface of the interchangeable lens, and the operation of restricting the zoom range may be made by the user operating the operation member. On the other hand, this embodiment moves (presses) the protective frame 461 to the object side by the intermediate adapter mounted on the interchangeable lens 101 to restrict the zoom range, and moves the protective frame 461 toward the image side by the biasing force and releases the restriction on the zoom range by detaching the intermediate adapter from the interchangeable lens 101. Therefore, it is unnecessary to provide an operation member for restricting the zoom range to the interchangeable lens 101, and the operation of the operation member by the user can be eliminated. It is possible to prevent a phenomenon that occurs when the user does not operate the operation member (for example, the lens gets damaged by an erroneous operation).

Second Embodiment

Figure 7:
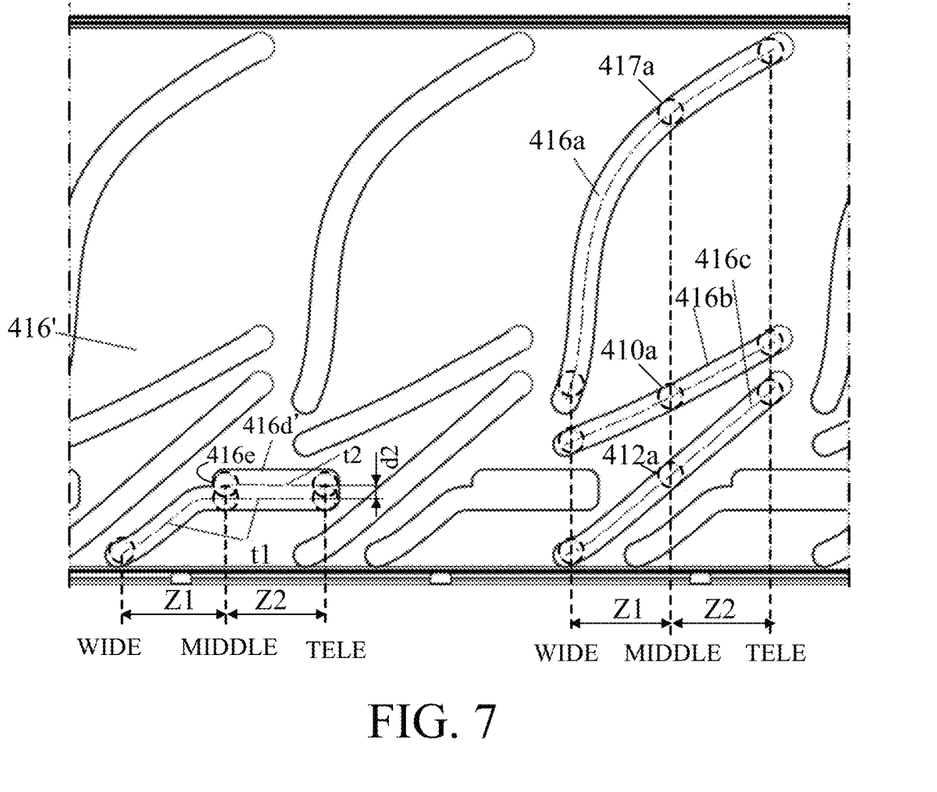
FIG. 7 is a developed view of a cam ring in an interchangeable lens according to a second embodiment of the present invention.

Next follows a second embodiment of the present invention. FIG. 7 illustrates a cam ring 416' in the interchangeable lens according to this embodiment developed in the direction around the optical axis and viewed from the outer circumferential side. The cam groove portions 416a, 416b, and 416c provided to the cam ring 416' are the same as those of the cam ring 416 according to the first embodiment.

In the first embodiment, when the extender 102 is attached to the interchangeable lens 101, the zoom ring 435 is restricted from rotating because the locking portion 462c of the stopper member 462 contacts the locking portion 435c of the zoom ring 435. The reason why the rotation end is provided to the zoom ring 435 is that the rotation of the zoom ring 435 moves the front barrel 417 in the optical axis direction and the movement of the front barrel 417 rotates the cam ring 416.

On the other hand, this embodiment adopts a structure in which the zoom ring 435 and the cam ring 416' are directly connected and rotate together. In this structure, the rotation end of the zoom ring 435 can be determined by the cam ring 416' that serves as a movable member and a rotating member. Thus, there is no need to provide the stopper member 462 to the protective frame 461 unlike the first embodiment.

In FIG. 7, three cam followers 601 are provided to the protective frame 461 similarly to the cam follower 465 according to the first embodiment. While the first embodiment provides the stopper member 462 to the same position as one of the three cam followers 465, but this embodiment provides no stopper members 462.

By attaching the extender 102 to the interchangeable lens according to this embodiment in the zoom range Z2, the protective frame 461 is moved to the object side and accordingly the cam follower 601 is moved from the position t1 to the position t2 in the second cam area of the cam groove portion 416d'.

In the zoom state Middle when the extender 102 is attached to the interchangeable lens in this embodiment, the cam follower 601 contacts the stopper portion 416e at the end of the second cam area of the cam groove portion 416d' in the direction around the optical axis and prevents zooming from Middle to Wide. Thereby, the zoom range is limited to Z2, and the same effect as that of the first embodiment can be obtained.

The first and second embodiments have described the interchangeable lens in which the rotation of the zoom ring is transmitted to the zoom barrel. However, the present invention is similarly applicable to a power zoom type interchangeable lens that drives a zoom barrel by operating an electric actuator in accordance with a detected rotation of a zoom ring.

Third Embodiment

Next follows a third embodiment according to the present invention. While the first and second embodiments have described the lens unit (455) moving in the optical axis direction for zooming, the lens unit may move in the optical axis direction for focusing.

Figure 8A:
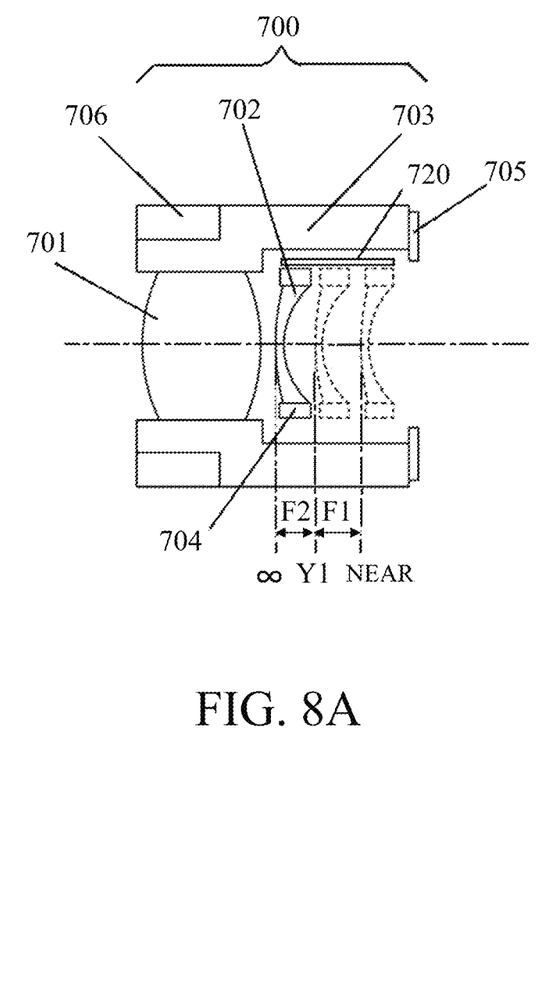
FIGS. 8A and 8B illustrate an interchangeable lens and an extender according to a third embodiment of the present invention.
Figure 8B:
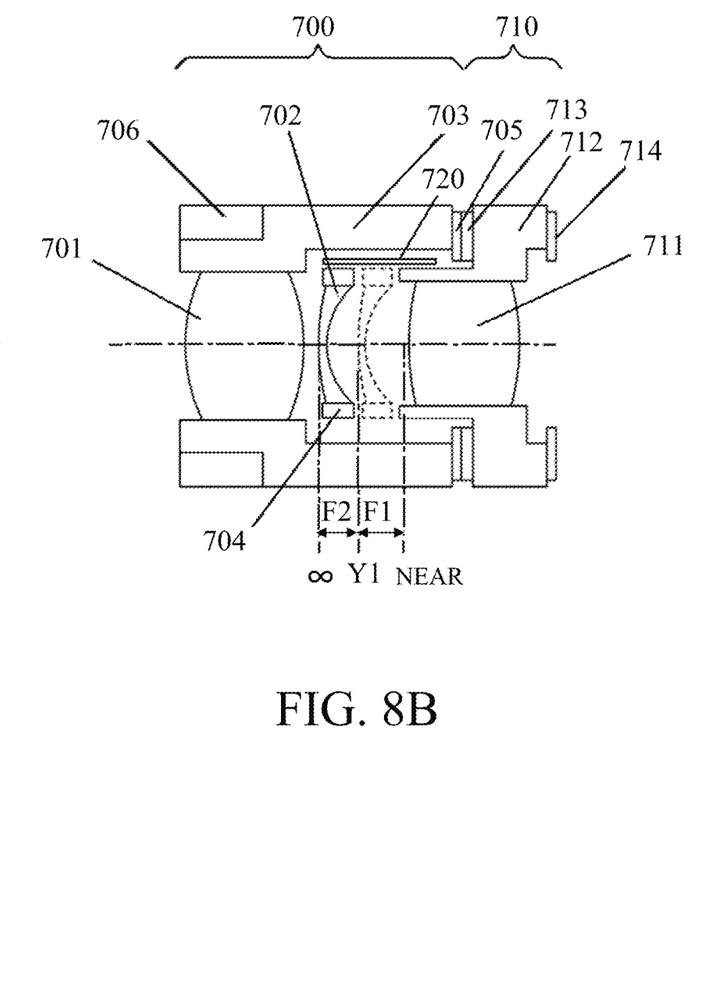

FIG. 8A illustrates a section of the interchangeable lens 700 according to this embodiment. FIG. 8B illustrates the interchangeable lens 700 and the extender 710 attached to it. The interchangeable lens 700 is a single focus lens having a rear focus type imaging optical system including a first lens group 701 and a focus lens group 702 disposed on the image side of the first lens group 701. The focus lens group 702 is disposed closest to the image side among a plurality of lens groups (701, 702) constituting the imaging optical system.

The first lens group 701 is held by a base barrel 703, and the focus lens group 702 is held by a focus barrel 704. A focus lens unit (702, 704) serving as a lens unit is constituted by the focus lens group 702 and the focus barrel 704 holding it. The focus barrel 704 is driven in the optical axis direction relative to the base barrel 703 by a focus actuator 720 serving as an electric actuator.

An MF ring unit 706 is rotatably supported by the base barrel 703 in the direction around the optical axis. When the user rotates the MF ring unit 706, the rotation is detected by an unillustrated sensor and the operation of the focus actuator 720 is controlled according to the rotating amount of the MF ring unit 706, so that the focus barrel 704 moves in the optical axis direction. Thereby, MF is performed.

A mount portion 705 is provided at an end of the base barrel 703 on the image side, and is attached to an unillustrated camera or an extender 710 as illustrated in FIG. 8B.

FIG. 8A illustrates the focus lens unit (702, 704) located at a position closest to the object side (infinity end) in the movable range by a solid line. Dotted lines indicate the focus lens unit (702, 704) located at the position closest to the image side (near end Near) and that the focus lens unit (702, 704) located at the predetermined intermediate focus position Y1 between the infinity end ∞ and the near end Near. In the following description, a range (the first position or the first movable range) on the near side from Y1 to Near in the movable range of the focus lens unit (702, 704) will be referred to as a focus area F1, and a range (the second position or the second movable range) on the infinity side from ∞ to Y1 will be referred to as a focus area F2.

As illustrated in FIG. 8B, in the extender 710, an extender lens group 711 is held by a base barrel 712. A lens-side mount portion 705 mounted on the interchangeable lens 700 and a camera-side mount portion 714 mounted on the camera are provided on the object side and the image side of the base barrel 712. Parts of the base barrel 712 and the extender lens group 711 protrude further toward the object side than the lens side mount part 705. Therefore, when the extender 710 is attached to the interchangeable lens 700 as illustrated in FIG. 8B, parts of the base barrel 712 and the extender lens group 711 in the extender 710 protrudes into the interchangeable lens 700.

The electrical configuration of the interchangeable lens 700 according to this embodiment is the same as that illustrated in FIG. 2. In other words, the interchangeable lens 700 has a lens CPU omitted in FIGS. 8A and 8B.

In this embodiment, the extender 710 can be attached to the interchangeable lens 700 where the focus lens unit (702, 704) is located in the focus area F2. On the other hand, when the focus lens unit (702, 704) is located in the focus area F1, the object-side end of the base barrel 712 of the extender 710 interferes with the image-side end of the focus barrel 704 and thus the extender 710 cannot be attached to the interchangeable lens 700.

The lens CPU detects that the interchangeable lens 700 is powered off where the interchangeable lens 700 is attached to the camera, and controls the focus actuator to move to move the focus lens units (702, 704) to the focus area F2 so that the extender 710 is detachably mountable on the interchangeable lens 700 when the interchangeable lens 700 is used next time. Thereafter, the les CPU turns off the power.

Figure 9:
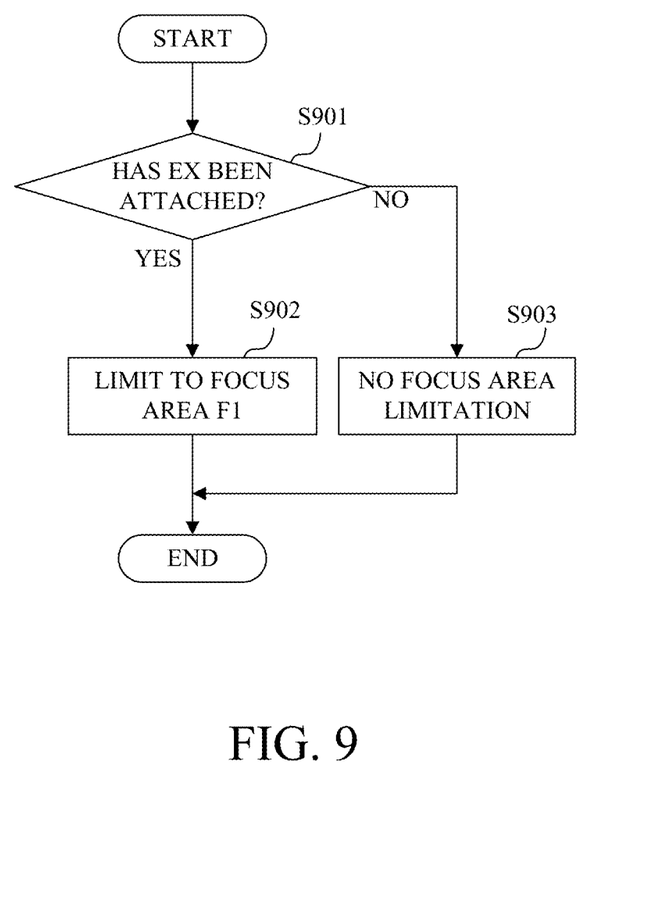
FIG. 9 is a flowchart showing processing performed by a lens CPU according to the third embodiment.

FIG. 9 shows processing performed by the lens CPU as a (movement) restrictor. When the extender 710 (camera-side mount portion 714) attached to the interchangeable lens 700 is attached to the camera and the camera is powered on, the started lens CPU detects whether or not the extender 710 is attached to the interchangeable lens 700 in the step S901.

If the extender 710 is attached, the lens CPU proceeds to the step S902, and electrically limits the movable range of the focus lens unit (702, 704) only to the focus area F2. More specifically, even when the MF ring unit 706 is rotated from the focus area F2 to the focus area F1, the operation of the focus actuator 720 is controlled so that the focus lens unit (702, 704) do not move to the focus area F1.

On the other hand, if the extender 710 is not attached, the flow proceeds to the step S903 and the lens CPU controls the operation of the actuator 720 so that the focus lens unit (702 and 704) can be moved in the focus areas F1 and F2 in accordance with the rotation operation of the MF ring unit 706.

Even the interchangeable lens 700 according to this embodiment can make the extender 710 detachably mountable without securing a value necessary to mount the extender 710 in the entire focus area as the minimum backfocus value. Where the extender 710 is attached to the interchangeable lens 700, the focus area is limited to F2 and focusing is unavailable on the near side but focusing is available on the infinity side for imaging using the extender 710.

When the extender 710 is attached to the interchangeable lens 700, the focus lens units (702, 704) do not move to the focus area F1 where it may interfere with the extender 710.

This embodiment has described that the lens CPU detects the attachment of the extender 710 to the interchangeable lens 700 and restricts limits the focus lens unit (702, 704) from moving. However, the camera CPU or the extender CPU may detect the attachment of the extender to the interchangeable lens, and makes the lens CPU as the movement restrictor restrict the focus lens unit (702, 704) from moving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The above embodiment can avoid interference between the movable lens unit and the attached intermediate adapter.

This application claims the benefit of Japanese Patent Application No. 2019-041099, filed on Mar. 7, 2019, which is hereby incorporated by reference herein in its entirety.

What is claimed is:

1. A lens apparatus of which an image side part is detachably mountable to an accessory, the lens apparatus comprising:
a lens unit that includes a lens disposed closest to the image side part and a holding member that holds the lens, and is movable in an optical axis direction; and
a restrictor configured to restrict a movement of the lens unit,
wherein when the lens unit is located at a first position, the accessory is not mountable to the lens apparatus, and when the lens unit is located at a second position, the accessory is mountable to the lens apparatus, and
wherein the restrictor restricts the lens unit from moving to prevent the lens unit from contacting with the accessory when the accessory is attached to the lens apparatus.

2. The lens apparatus according to claim 1, further comprising a movable member configured to move when the lens unit moves,
wherein the restrictor includes a movement restricting member configured to contact the movable member to restrict the lens unit from moving.

3. The lens apparatus according to claim 2, wherein the movable member is rotatable around an optical axis, and
wherein the movement restricting member contacts the movable member in a direction orthogonal to the optical axis to restrict the lens unit from moving.

4. The lens apparatus according to claim 2, wherein the movable member is operated by a user.

5. The lens apparatus according to claim 1, further comprising an attachment restricting member movable between a third position at which the attachment restricting member contacts the accessory and restricts the accessory from attaching to the lens apparatus, and a fourth position for permitting the accessory to be attached to the lens apparatus.

6. The lens apparatus according to claim 5, further comprising a control member configured to restrict the attachment restricting member from moving when the lens unit is located at the first position, and to permit the attachment restricting member to move when the lens unit is located at the second position.

7. The lens apparatus according to claim 6, wherein the control member includes:
a first cam portion configured to move the lens unit in the optical axis direction by rotating around the optical axis; and
a second cam portion configured to restrict the attachment restricting member from moving when the lens unit is located at the first position, and to permit the attachment restricting member from moving when the lens unit is located at the second position.

8. The lens apparatus according to claim 5, further comprising a biasing member configured to bias the attachment restricting member,
wherein the attachment restricting member is pressed by the accessory and moved to the fourth position when the accessory is attached to the lens apparatus, and
wherein the attachment restricting member is biased by the biasing member and moved to the third position when the accessory is detached from the lens apparatus.

9. The lens apparatus according to claim 1, wherein the restrictor restricts the lens unit from moving by restricting an operation of the actuator for moving the lens unit.

10. The lens apparatus according to claim 1, wherein the lens unit moves in the optical axis direction during zooming, and the first position is closer to a wide-angle end than the second position.

11. The lens apparatus according to claim 1, wherein the lens unit moves in the optical axis direction during focusing, and the first position is closer to a near side than the second position.

12. An optical apparatus comprising:
the lens apparatus according to claim 1; and
an accessory detachably mountable to the image side part.

13. The optical apparatus according to claim 12, wherein the accessory includes an optical element located inside the lens apparatus when the accessory is attached to the lens apparatus.

14. An imaging system comprising:
the lens apparatus according to claim 1;
an accessory detachably mountable to the image side part; and
an imaging apparatus to which the accessory is detachably mountable.

* * * * *